US011820022B2

(12) United States Patent
Edwards et al.

(10) Patent No.: US 11,820,022 B2
(45) Date of Patent: *Nov. 21, 2023

(54) INTEGRATED ITEM DECANTING SYSTEM

(71) Applicant: Walmart Apollo, LLC, Bentonville, AR (US)

(72) Inventors: Ben Edwards, Fayetteville, AR (US); Brian C. Roth, Bentonville, AR (US); Paul Durkee, Centerton, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/958,928

(22) Filed: Oct. 3, 2022

(65) Prior Publication Data
US 2023/0034586 A1 Feb. 2, 2023

Related U.S. Application Data

(63) Continuation of application No. 16/453,023, filed on Jun. 26, 2019, now Pat. No. 11,491,656.
(Continued)

(51) Int. Cl.
*B25J 9/16* (2006.01)
*B25J 9/00* (2006.01)
(Continued)

(52) U.S. Cl.
CPC ........... *B25J 9/1687* (2013.01); *B25J 9/0093* (2013.01); *B25J 9/1682* (2013.01); *B25J 9/1694* (2013.01);
(Continued)

(58) Field of Classification Search
CPC ...... B25J 9/1687; B25J 9/0093; B25J 9/1682; B25J 9/1694; B25J 9/0084; B65G 1/1373;
(Continued)

(56) References Cited

U.S. PATENT DOCUMENTS 7,991,505 B2  8/2011  Lert, Jr. et al.
9,120,622 B1  9/2015  Elazary et al.
(Continued)

OTHER PUBLICATIONS

Noakes, A., "The Secret World of Robotic Warehouse Automation", LinkedIn, Jun. 22, 2018, retrieved from https://www.linkedin.com/pulse/secret-world-robotic-warehouse-automation-adam-noakes, 4 pages.
(Continued)

*Primary Examiner* — Abby Y Lin
*Assistant Examiner* — Dylan M Katz
(74) *Attorney, Agent, or Firm* — Barta, Jones & Foley, PLLC

(57) ABSTRACT

Examples provide a system for system for customized item decanting. A robotic picker device is configured to remove a selected item from a selected case in an open configuration on a conveyor device. A decan manager, implemented on a processor, is configured to identify a destination tote in a set of totes for placement of the selected item, The robotic picker device places the selected item into the destination tote and the decant manager analyzes sensor data and item data associated with the selected item to confirm an identification of the selected item placed into the destination tote for inventory update.

20 Claims, 14 Drawing Sheets

Related U.S. Application Data

(60) Provisional application No. 62/827,688, filed on Apr. 1, 2019.

(51) Int. Cl.
*G06Q 10/087* (2023.01)
*B65G 1/137* (2006.01)
*B65G 59/02* (2006.01)

(52) U.S. Cl.
CPC ......... *B65G 1/1373* (2013.01); *G06Q 10/087* (2013.01); *B65G 59/02* (2013.01)

(58) Field of Classification Search
CPC ... B65G 59/02; G06Q 10/087; B65B 69/0033
See application file for complete search history.

(56) References Cited

U.S. PATENT DOCUMENTS

| | | | |
|---|---|---|---|
| 9,919,872 | B2 | 3/2018 | Khodl et al. |
| 10,360,531 | B1 * | 7/2019 | Stallman ............... G06Q 10/087 |
| 2010/0198392 | A1 | 8/2010 | Eliuk et al. |
| 2010/0298973 | A1 | 11/2010 | Doke et al. |
| 2015/0066199 | A1 | 3/2015 | Shimono |
| 2015/0203304 | A1 | 7/2015 | Morency et al. |
| 2016/0355337 | A1 | 12/2016 | Lert et al. |
| 2017/0043953 | A1 | 2/2017 | Battles et al. |
| 2018/0150793 | A1 | 5/2018 | Lert, Jr. et al. |
| 2018/0247257 | A1 | 8/2018 | Lert, Jr. et al. |
| 2018/0273298 | A1 * | 9/2018 | Wagner ................ B65G 1/1371 |
| 2020/0223066 | A1 * | 7/2020 | Diankov ............... B25J 9/1664 |

OTHER PUBLICATIONS

Unknown, "Tasko, Norway: Automation Of Distribution Center", Swisslog, captured Apr. 2019, retrieved from https://www.swisslog.com/en-us/warehouse-logistics-distribution-center-automation/case-studies-and-resources/case- studies/2016/07/asko-sl, 7 pages.

Copenheaver, Blaine R., "International Search Report", International Application No. PCT/US2020/023904, dated Jun. 18, 2020, 2 pages.

Copenheaver, Blaine R., "Written Opinion", International Application No. PCT/US2020/023904, dated Jun. 18, 2020, 6 pages.

Srinivas Akella, "Robotic Manipulation for Parts Transfer and Orienting: Mechanics, Planning, and Shape Uncertanty", Carnegie Mellon University, Dec. 1996, 70 pages.

* cited by examiner

INTEGRATED ITEM DECANTING SYSTEM

This application is a continuation of U.S. application Ser. No. 16/453,023, filed Jun. 26, 2019, which claims the benefit of priority to U.S. Provisional Application No. 62/827,688, filed Apr. 1, 2019, which are incorporated herein by reference in their entireties.

BACKGROUND

Items are typically shipped to a store, warehouse or distribution center packed in cases. These cases can be packed onto a pallet for shipping. When the pallet arrives at its destination, a human user manually removes each case (box) from the pallet, cuts open each case and then manually removes each item from each case. As each item is removed, it is identified and manually placed into a tote or bin for storage until needed for restocking displays, order-fulfillment or delivery to a customer. This manual item decanting process is labor-intensive, time-consuming and inefficient.

SUMMARY

Some examples provide a system for customized item decanting from a plurality of cases for induction into an automated tote storage device. The system includes a robotic de-palletizing device that removes a selected case comprising a set of items from a pallet at a de-palletizing station. A robotic case opener devices open the selected case using a cutting implement attached to a portion of a member of the robotic case opener device associated with a conveyor device. A robotic picker device removes a selected item from the selected case if the selected case is in an open configuration on the conveyor device. A data storage device stores item data, including a destination tote associated with the selected item. The robotic picker device places the selected item into the destination tote. A robotic tote transfer device transfers the destination tote to an induction point of an automated storage device.

Other examples provide a computer-implemented method for customizing decanting of items into a tote storage device. A set of sensor devices scan a selected case, including a set of items within the selected case. A decant manager component analyzes inventory data and sensor data generated by the set of sensor devices to identify the set of items. A robotic case opener device opens the selected case. A robotic picker device removes a selected item from the selected case. The system identifies a destination tote in a set of totes for the selection item based on item data associated with the selected item. A robotic tote transfer device moves the destination tote to an induction point of an automated storage device on condition the destination tote has reached a full tote status.

Still other examples provide a set of robotic decanting devices for decanting items from a set of cases. The set of robotic decanting devices includes a conveyor device that moves a set of cases along at least one conveyor belt. A stationary robotic case opener device opens a selected case using a cutting implement attached to a portion of a member of the robotic case opener device. A set of sensor devices generates sensor data associated with each item removed from the selected case on the conveyor device. A robotic picker device removes a selected item from the selected case on condition the selected case is in an open configuration. The robotic picker device places the selected item into a selected compartment of a destination tote identified based on an analysis of the sensor data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

Referring to the figures, examples of the disclosure enable autonomous transfer of items from cases into totes for storage without human intervention. In some examples, a set of robotic decanting devices automatically remove a case from a pallet, cut open the case, remove the contents of the cases and place the contents of the cases into one or more appropriate totes for storage. A tote is a container, bin, box or other receptacle for holding one or more items. A tote in some examples, includes a bottom member and four side members. A tote can optionally include a lid. The lid can be a removable lid or a hinged lid.

Referring again to FIG. 1, an exemplary block diagram illustrates a system 100 for decanting items from a set of cases into a set of destination totes for induction into an automated tote storage device. The automated tote storage device is a device having compartments, slots, cubes or storage spaces for storing a plurality of totes. A tote is a container for storing one or more items. A tote can include a storage bin, box, or any other type of container. In some non-limiting examples, a tote is a rectangular bin having a bottom member and four side members. The tote can optionally include one or more handles.

Figure 1:
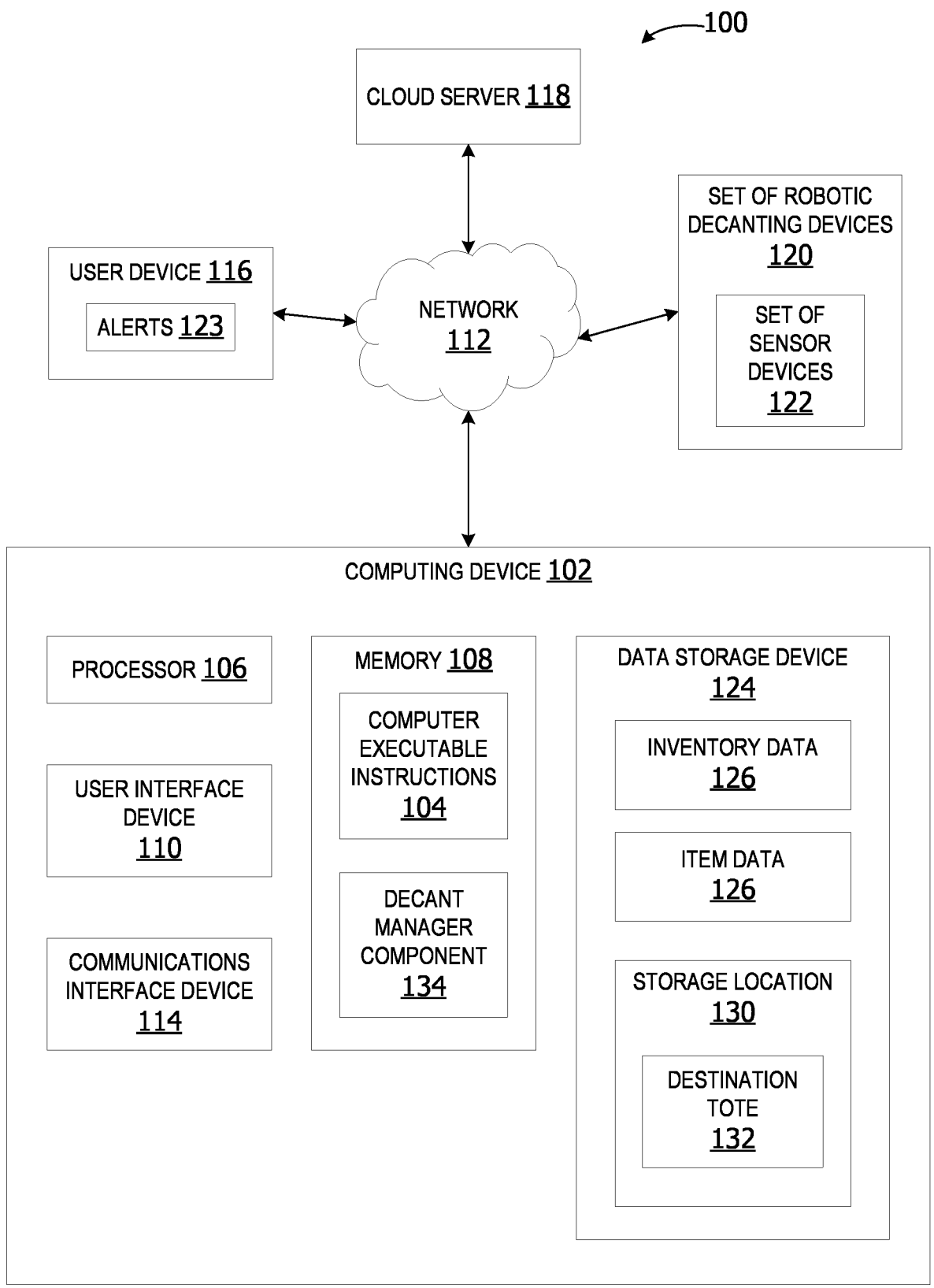
FIG. 1 is an exemplary block diagram illustrating a system for decanting items from a set of cases into a set of destination totes for induction into a tote storage device.

In the example of FIG. 1, the computing device 102 represents any device executing computer-executable instructions 104 (e.g., as application programs, operating system functionality, or both) to implement the operations and functionality associated with the computing device 102. The computing device 102 in some examples includes a mobile computing device or any other portable device. A mobile computing device includes, for example but without limitation, a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 106 and a memory 108. The computing device 102 can optionally include a user interface component 110.

The processor 106 includes any quantity of processing units and is programmed to execute the computer-executable instructions 104. The computer-executable instructions 104 is performed by the processor 106, performed by multiple processors within the computing device 102 or performed by a processor external to the computing device 102. In some examples, the processor 106 is programmed to execute instructions such as those illustrated in the figures (e.g., FIG. 17, FIG. 18, FIG. 19 and FIG. 20).

The computing device 102 further has one or more computer-readable media such as the memory 108. The memory 108 includes any quantity of media associated with or accessible by the computing device 102. The memory 108 in these examples is internal to the computing device 102 (as shown in FIG. 1). In other examples, the memory 108 is external to the computing device (not shown) or both (not shown). The memory 108 can include read-only memory and/or memory wired into an analog computing device.

The memory 108 stores data, such as one or more applications. The applications, when executed by the processor 106, operate to perform functionality on the computing device 102. The applications can communicate with counterpart applications or services such as web services accessible via a network 112. In an example, the applications represent downloaded client-side applications that correspond to server-side services executing in a cloud.

In other examples, the user interface component 110 includes a graphics card for displaying data to the user and receiving data from the user. The user interface component 110 can also include computer-executable instructions (e.g., a driver) for operating the graphics card. Further, the user interface component 110 can include a display (e.g., a touch screen display or natural user interface) and/or computer-executable instructions (e.g., a driver) for operating the display. The user interface component 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 102 in one or more ways.

The network 112 is implemented by one or more physical network components, such as, but without limitation, routers, switches, network interface cards (NICs), and other network devices. The network 112 is any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface component 114. The communications interface component 114 includes a network interface card and/or computer-executable instructions (e.g., a driver) for operating the network interface card. Communication between the computing device 102 and other devices, such as but not limited to, a user device 116, a cloud server 118, a set of robotic decanting devices 120 and/or a set of sensor devices 122, can occur using any protocol or mechanism over any wired or wireless connection. In some examples, the communications interface component 114 is operable with short range communication technologies such as by using near-field communication (NFC) tags.

The user device 116 represents any device executing computer-executable instructions. The user device 116 can be implemented as a mobile computing device, such as, but not limited to, a wearable computing device, a mobile telephone, laptop, tablet, computing pad, netbook, gaming device, and/or any other portable device. The user device 116 includes at least one processor and a memory. The user device 116 can also include a user interface component.

In this non-limiting example, the computing device 102 outputs alerts 123 to the user device 116. An alert includes a notification, warning or status update associated with the decanting process. In one example, the alerts 123 can include a notification that an item removed from a case cannot be identified. In another example, the alerts 123 can include a notification that an empty tote is unavailable, the destination tote is unidentified, the destination tote is full, the destination tote is unavailable, a tote is missing a label, a case is missing a label, an item is missing a label, an item is damaged or unidentifiable, an item removed from a case is nonconforming with inventory records/invoices, etc.

The cloud server 118 is a logical server providing services to the computing device 102 or other clients, such as, but not limited to, the user device 116. The cloud server 118 is hosted and/or delivered via the network 112. In some non-limiting examples, the cloud server 118 is associated with one or more physical servers in one or more data centers. In other examples, the cloud server 118 is associated with a distributed network of servers.

The set of robotic decanting devices 120 includes one or more robotic devices for cutting open a case (box), removing a smaller case from inside a larger case, removing an individual item from a case, moving a case from one location to another, moving an individual item from one location to another, placing an item into a tote, and/or moving a tote to a tote storage device. The set of robotic decanting devices 120 can also include one or more robotic devices for removing cases from a pallet (de-palletizing). The tote storage device is an automated storage and retrieval system for storing totes. The stored totes can include both empty totes, as well as totes storing one or more items.

An item in a tote can be an ambient temperature item, a chilled item or a frozen item. A chilled item is an item stored in a temperature-controlled environment to maintain a chilled temperature, such as, but not limited to, milk, cheese, or other perishable items. A frozen item is an item maintained in a frozen or semi-frozen state, such as, but not limited to, ice cream, frozen meals, ice, etc.

The set of sensor devices 122 is a set of one or more devise for scanning a case or item and identifying the case or item based on the sensor data generated by the set of sensor devices 122. The set of sensor devices 122 can include, without limitation, barcode readers for reading barcodes on cases or items, radio frequency identification (RFID) tag readers for obtaining RFID tag data from RFID tags on case or items, cameras for capturing images of labels on cases, labels on items or item packaging, etc. The set of sensor devices 122 can also include weight sensors for generating weight data associated with items removed from a case or items placed into a tote. The weight data can be used to identify an item and/or determine when a tote is full.

The system 100 can optionally include a data storage device 124 for storing data, such as, but not limited to inventory data 126, item data 128, storage location 130 data and/or a destination tote 132 for each item.

The inventory data 126 is data associated with inventory of items or totes within the automated tote storage device, inventory of a set of totes, inventory of a selected tote, inventory of a compartment within a segmented tote, inventory of a case, inventory of a set of cases, and/or inventory of a pallet. A segmented tote is a tote including at least one divider creating at least two compartments within the tote's interior. A segmented tote can include two or more compartments. An unsegmented tote includes a single, undivided compartment.

The item data 128 can include data associated with the type of item, weight of the item, name of the item, size of the item, barcode data, RFID tag data, store keeping unit (SKU), or other data associated with an item. The item data 128 can also include image data associated with the image or appearance of the item, item packaging and/or item label used to identify an item based on image data.

The storage location 130 is data associated with the location in which each item should be stored after removal from a pallet and/or removal from a case. The storage location 130 in this example includes a destination tote 132. The destination tote is the identification of the appropriate tote in a plurality of totes in which a given item should be stored/placed for storage.

The data storage device 124 can include one or more different types of data storage devices, such as, for example, one or more rotating disks drives, one or more solid state drives (SSDs), and/or any other type of data storage device. The data storage device 124 in some non-limiting examples includes a redundant array of independent disks (RAID) array. In other examples, the data storage device 124 includes a database.

The data storage device 124 in this example is included within the computing device 102 or associated with the computing device 102. In other examples, the data storage device 124 includes a remote data storage accessed by the computing device via the network 112, such as a remote data storage device, a data storage in a remote data center, or a cloud storage.

The memory 108 in some examples stores one or more computer-executable components. Exemplary components include a decant manager component 134. The decant manager component 134 analyzes sensor data generated by the set of sensor devices with inventory data to identify the set of items removed from a case by the set of robotic decanting devices 120. The decant manager component 134 can also analyze the sensor data to identify a tote, identify a case, identify an item and/or identify a location of an item. The system can identify items inside a case, identify items as they are removed from a case, and/or identify items placed into a tote or tote compartment.

The decant manager component 134 identifies the destination tote 132 in a set of totes for placement of an item. If the destination tote is segmented, the decant manager component 134 identifies a specific compartment of the segmented destination tote for placement of the selection item based on item data 128 associated with the selected item.

The decant manager component 134 in some examples updates inventory data 126 associated with the destination tote 132 to include the selected item in the tote's inventory. The inventory update can include updating a tote compartment inventory associated with the destination tote to include the selected item. In still other examples, the decant manager component 134 updates a storage device inventory to include a contents of the destination tote on condition the destination tote is successfully inducted into the storage device.

Figure 2:
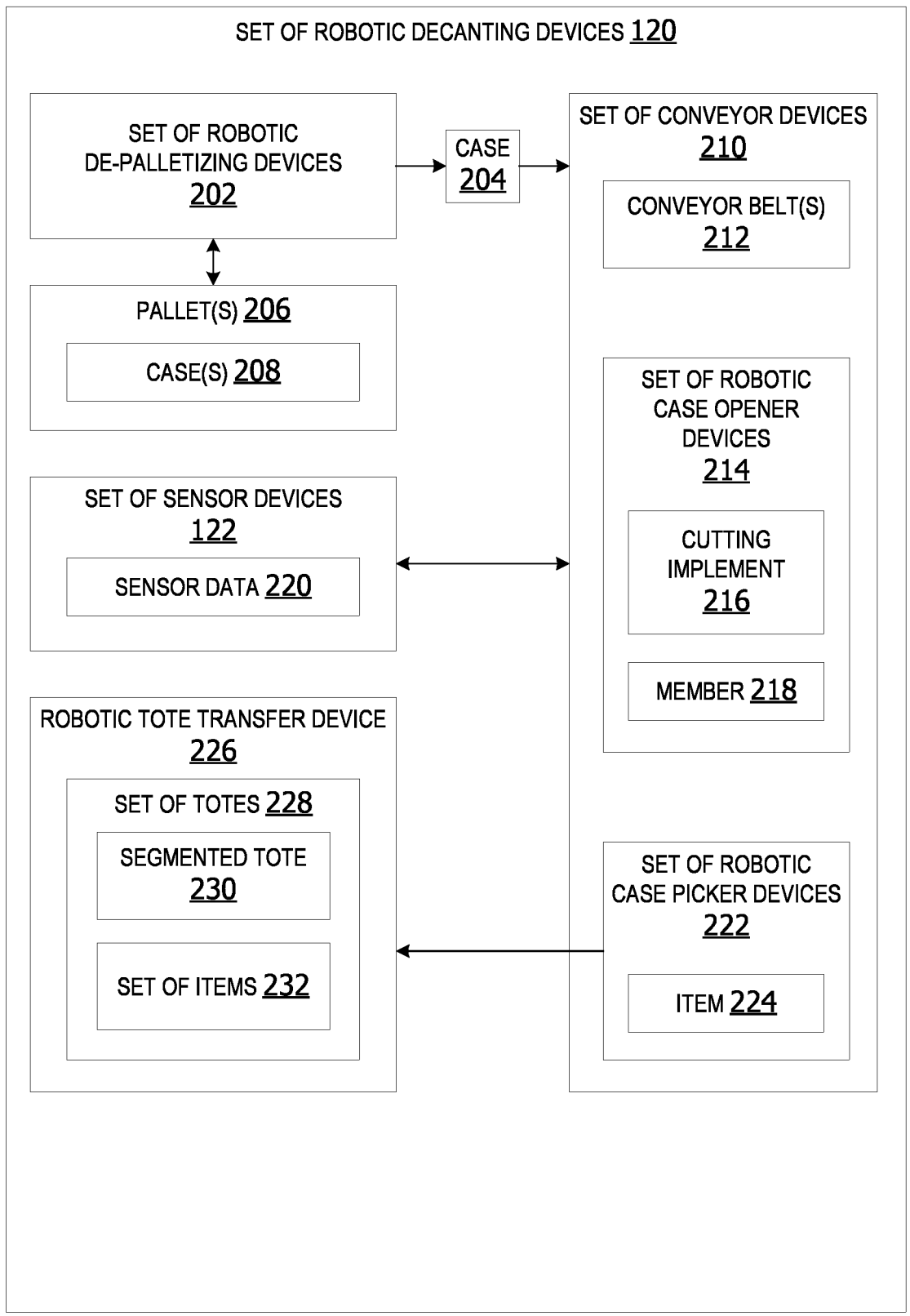
FIG. 2 is an exemplary block diagram illustrating a set of robotic decanting devices.

FIG. 2 is an exemplary block diagram illustrating a set of robotic decanting devices 120. The set of robotic decanting devices 120 in some examples includes a set of one or more robotic de-palletizing devices 202 for removing cases from a pallet, such as, but not limited to, the case 204. A case is a box or other containing enclosing one or more items. A case can include a larger case enclosing two or more smaller cases. In some non-limiting examples, a case is a cardboard box enclosing a plurality of items. A case can be a case of items from a supplier, a vendor, a distribution center, a warehouse or a retail store.

The set of robotic de-palletizing devices 202 removes one or more case(s) 208 from one or more pallet(s) 206 in a de-palletizing station. The depalletizing station is an area within a distribution center, warehouse, storeroom, retail store, or a location associated with an automated storage and retrieval system. The set of robotic de-palletizing devices 202 removes each case from each pallet and places each case on an appropriate conveyor device in a set of conveyor devices 210.

The set of conveyor devices 210 is a set of one or more conveyor devices for conveying or moving a case 204 from one location to another along a conveyor belt or other conveyance device. The set of conveyor devices 210 in this example includes one or more conveyor belt(s) 212 for moving the case(s) 208, such as the case 204, from the de-palletizing station to a set of robotic case opener devices 214.

The set of robotic case opener devices 214 includes one or more devices for opening the case 204. A robotic case opener device in the set of robotic case opener devices 214 is a stationary device that includes a cutting implement 216 attached to at least one articulating member 218 of the device for cutting open at least a portion of the case 204. The cutting implement in this non-limiting example is a box cutter.

After opening the case 204, a set of robotic picker devices 222 removes the contents of each case on the set of conveyor devices 210. A robotic picker device 222 removes an item 224 from the open case 204 via an articulating member, such as a gripping mechanism, a hook, a lifting mechanism, or any other mechanism for removing the item 224 from the interior of a case 204.

A robotic picker device places a set of items 232, including the item 224, into a destination tote in a set of one or more totes 228. The set of totes 228 can include a segmented tote 230 or an unsegmented tote. When the selected tote is full, a robotic tote transfer device 226 transfers (moves) the full tote to an induction point of a tote storage device.

The robotic tote transfer device 226 is a self-propelled and automated device for moving one or more totes. In some non-limiting examples, the robotic tote transfer device 226 can include a motor, a set of wheels, a navigation system, a set of sensor devices, an engine, a solar power generator and/or a network device for receiving instructions from a computing device. The robotic tote transfer device 226 can be implemented as a carousel-type device, self-propelled cart or a shuttle table.

Figure 3:
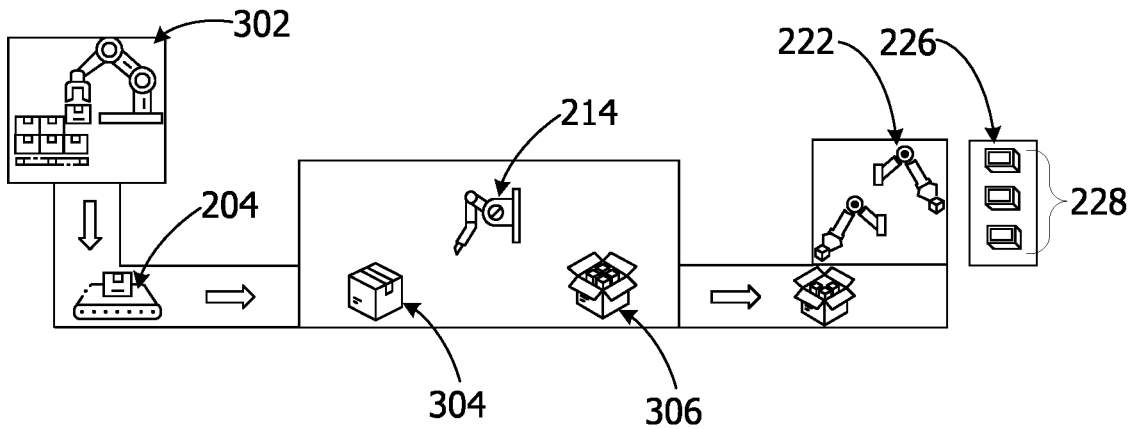
FIG. 3 is an exemplary block diagram illustrating the set of robotic decanting devices for decanting items into a set of segmented totes for induction into the automated tote storage device.

FIG. 3 is an exemplary block diagram illustrating the set of robotic decanting devices for decanting items into a set of segmented totes for induction into the tote storage device. A depalletizing station in this example includes a depalletizing device 302 for removing a case 204 from a pallet. A set of robotic case opener devices 214 opens each case as it moves down the conveyor device. Prior to opening, each case is in a closed configuration 304. After opening, each case is in an open configuration 306. A set of robotic picker devices 222 removes each item from each case. The set of robotic picker devices places each item into an appropriate tote in a set of totes 228.

Figure 4:
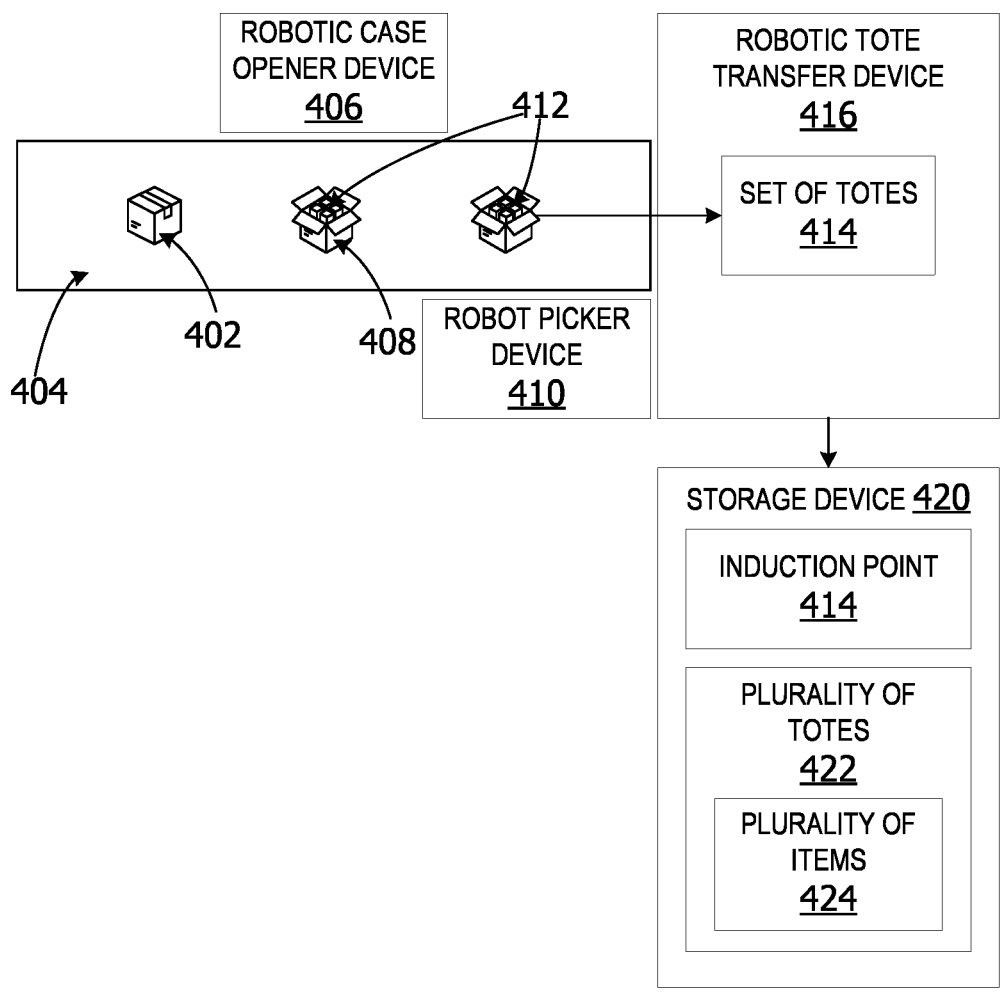
FIG. 4 is an exemplary block diagram illustrating the set of robotic decanting devices for decanting items from a set of cases into a set of totes.

FIG. 4 is an exemplary block diagram illustrating the set of robotic decanting devices for decanting items from a set of cases into a set of totes. An unopened case 402 is placed onto the conveyor device 404 by a depalletizing robotic device or by a user. A robotic case opener device 406 opens the case. The open case 408 is moved along the conveyor device 404 to a robotic picker device 410. The robotic picker device 410 removes the contents 412 of the open case 408 and places the contents 412 into one or more totes in a set of totes 414. A robotic tote transfer device 416 moves the set of totes 414 to an induction point 418 of a tote storage device 420 when the set of totes are full.

The induction point 418 is an opening, slot or entrance point for placing or moving a tote into an interior portion of the automated tote storage device 420. The storage device 420 stores a plurality of items 424 within a plurality of totes 422 for storage and later retrieval.

Figure 5:
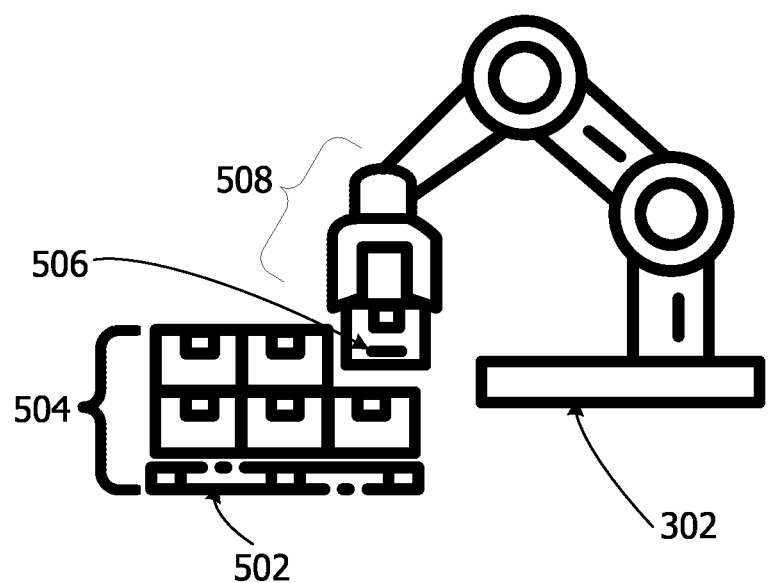
FIG. 5 is an exemplary block diagram illustrating a robotic de-palletizing device for removing a case from a pallet.

FIG. 5 is an exemplary block diagram illustrating a robotic de-palletizing device 302 for removing a case from a pallet 502. The robotic de-palletizing device 302 in some examples includes an articulating member, such as a gripping device, a squeezing device or a lifting device, for removing one case 506 from a set of cases 504 on the pallet 502.

Figure 6:
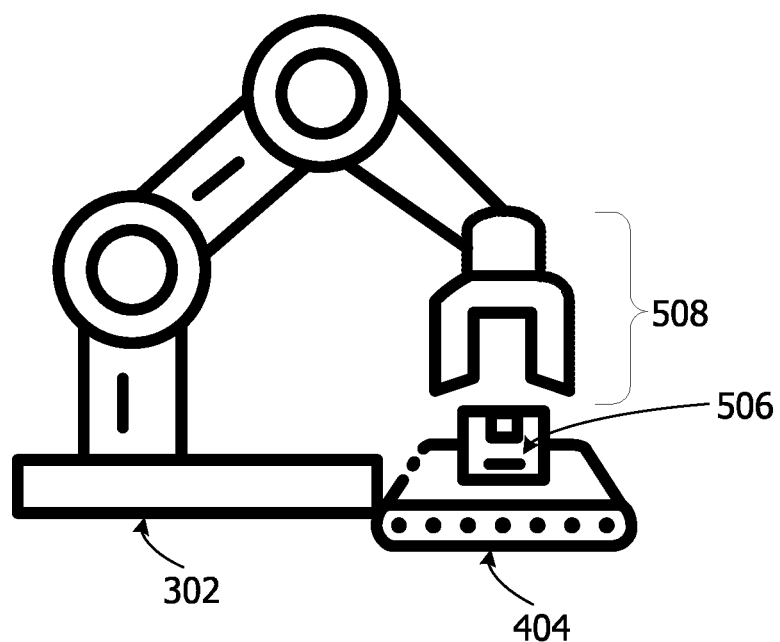
FIG. 6 is an exemplary block diagram illustrating the robotic de-palletizing device for moving a case onto a conveyor device.

FIG. 6 is an exemplary block diagram illustrating the robotic de-palletizing device 302 for moving a case 506 onto a conveyor device 404. The robotic de-palletizing device 302 places each case onto the conveyor device 404 for transport to a case opener device. Once the case 506 is positioned on the conveyor device 404, the articulating member 508 releases the case 506.

Figure 7:
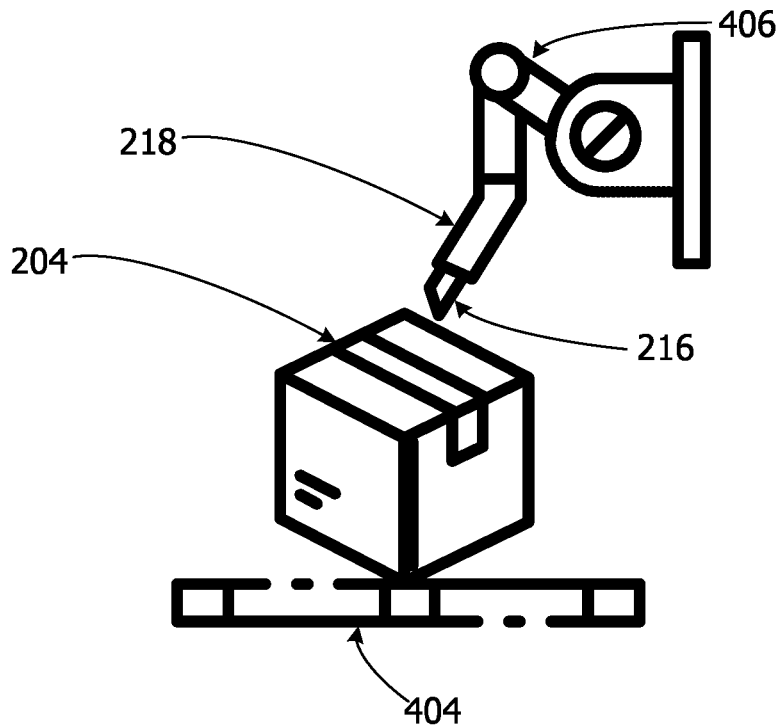
FIG. 7 is an exemplary block diagram illustrating a robotic case opener device for opening a selected case.

FIG. 7 is an exemplary block diagram illustrating a robotic case opener device 406 for opening a selected case 204. The robotic case opener device 406 includes a cutting implement 216 attached to a member 218 of the robotic case opener device 406. The member 218 in some example is articulated at one or more articulating points (joints). The robotic case opener device 406 in some examples utilizes the cutting implement 216 to cut along a strip of tape or other adhesive material securing two or more flaps on the case closed as the case sits on the conveyor device 404. After opening the case, the conveyor device 404 carries the case to the robotic picker device.

In this non-limiting example, the robotic case opener device 406 is a stationary device. A case is moved along a conveyor system to the stationary robotic case opener device or another robotic device delivers the selected case to the stationary robotic case opener device for opening.

Figure 8:
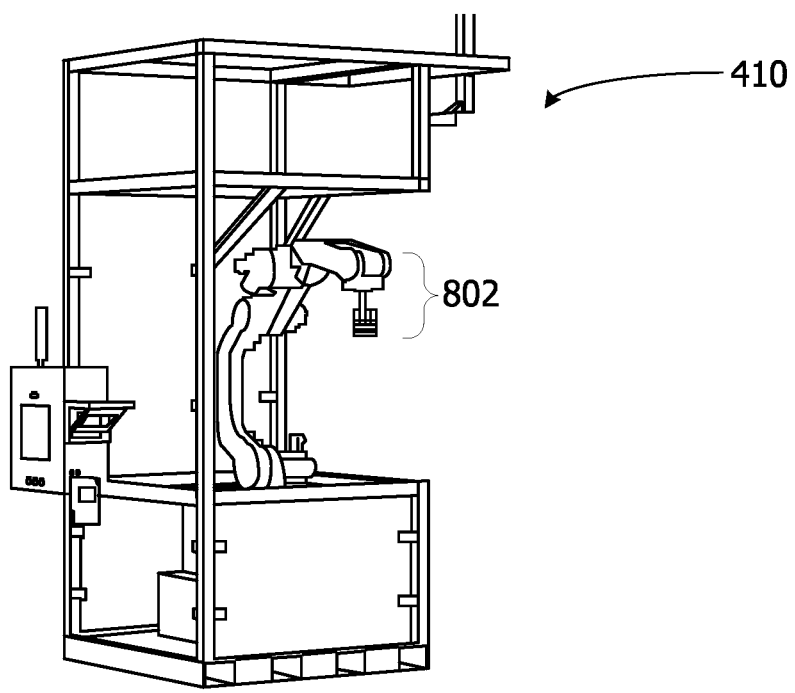
FIG. 8 is an exemplary block diagram illustrating a robotic picker device.

FIG. 8 is an exemplary block diagram illustrating a robotic picker device 410. The robotic picker device 410 in this example includes one or more articulating points enabling the robotic picker device to maneuver into and out of a case. A gripper 802 enables the robotic picker device 410 to grab an item inside a case and lift it out of the case.

Figure 9:
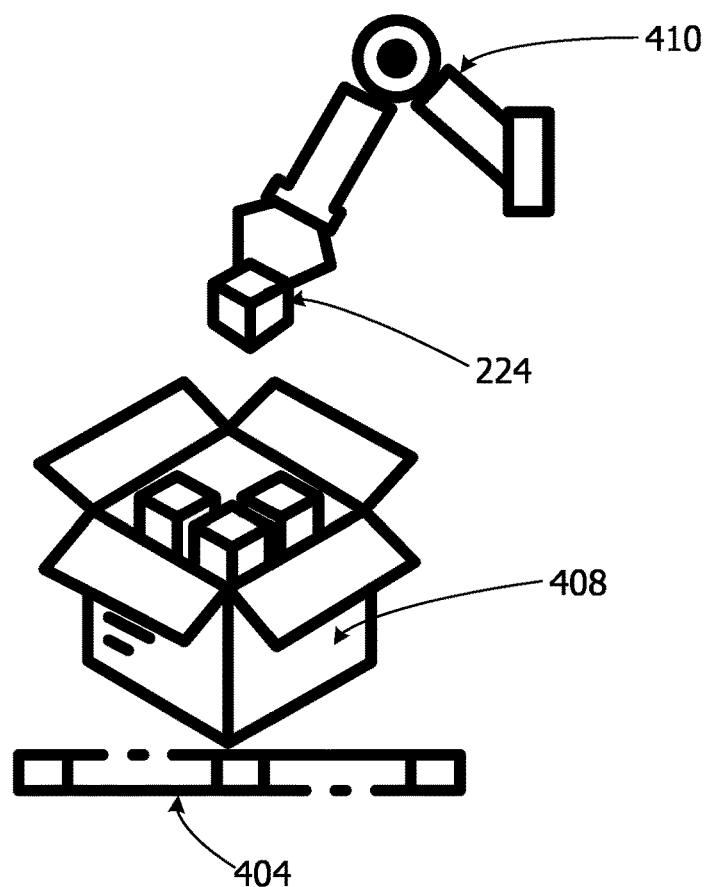
FIG. 9 is an exemplary block diagram illustrating a robotic picker device for removing a selected item from a case.

FIG. 9 is an exemplary block diagram illustrating a robotic picker device 410 for removing a selected item 224 from a case. The robotic picker device 410 removes the item 902 from the open case 408 on the conveyor device 404.

Figure 10:
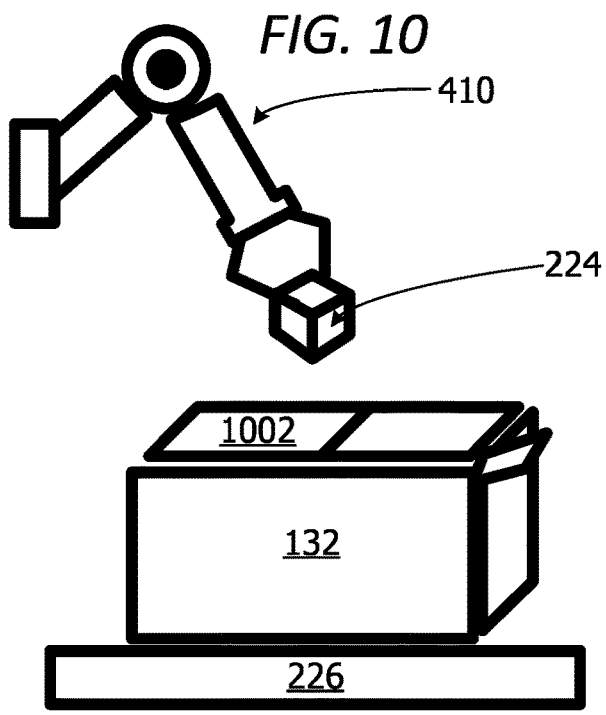
FIG. 10 is an exemplary block diagram illustrating a robotic picker device for placing a selected item into a compartment of a destination tote.

FIG. 10 is an exemplary block diagram illustrating a robotic picker device 410 for placing a selected item 224 into a compartment 1002 of a destination tote 132. The robotic picker device 410 places the item 224 into the correct compartment based on the item identification and/or instructions received from the decanting manager component. In this non-limiting example, the destination tote 132 includes a first compartment 1002 and a second compartment 1004 separated by a divider 1006. When the destination tote 132 is full, the robotic tote transfer device 226 autonomously transfers the destination tote to the tote storage device.

Figure 11:
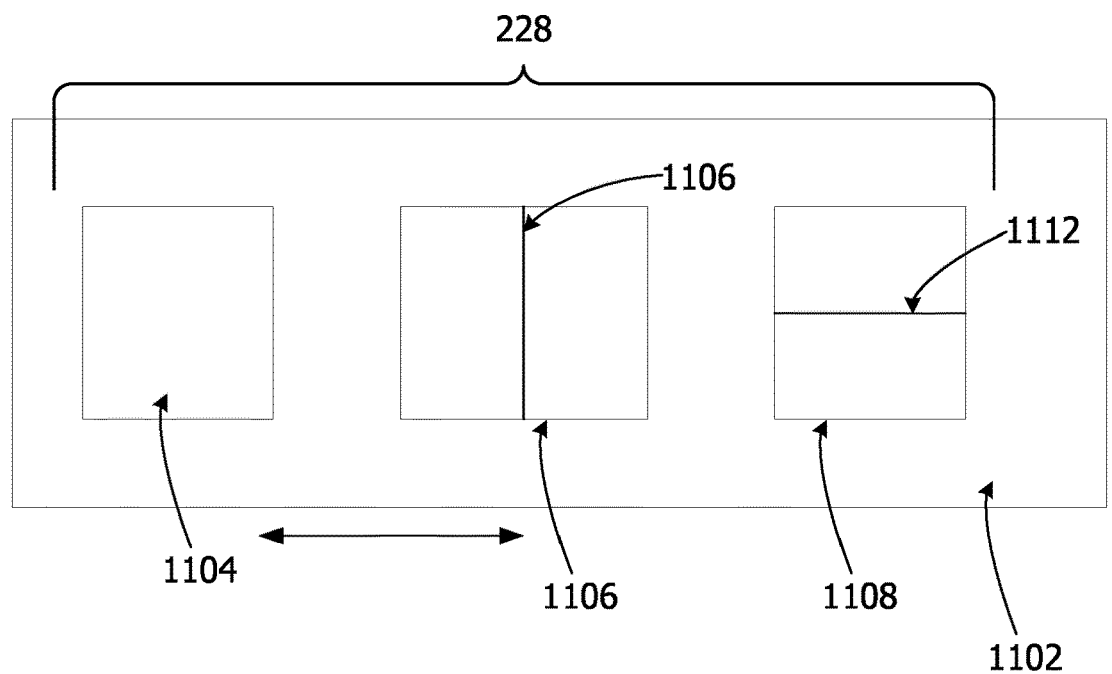
FIG. 11 is an exemplary block diagram illustrating a set of totes on a shuttle table.

FIG. 11 is an exemplary block diagram illustrating a set of totes 228 on a shuttle table 1102. The set of totes 228 in this example includes three totes. However, the examples are not limited to three totes. The set of totes 228 on the shuttle table 1102 in other examples can include a single tote, two totes, as well as four or more totes. In one non-limiting example, the shuttle table 1102 accommodates five (5) totes.

The set of totes 228 in this example includes an unsegmented tote 1104, a segmented tote 1106 and another segmented tote 1108. The examples are not limited to a single unsegmented tote. The set of totes 228 can include no segmented totes, as well as two or more unsegmented totes.

The segmented tote 1106 includes a single divider 1110 running along the width of the interior of the tote to create two compartments inside the tote. The segmented tote 1108 includes a single divider 1112 running along the length of the interior portion of the tote to create two interior compartments within the tote. However, a segmented tote is not limited to a tote having two compartments. A segmented tote can include three or more compartments.

The set of totes 228 in this example includes two segmented totes. The examples are not limited to only two segmented totes. The set of totes 228 can include a single segmented tote, no segmented totes, as well as three or more segmented totes.

The shuttle table 1102 is a robotic tote transfer device for moving the set of totes from one location or position to another location or position horizontally at an induction station. In this example, the shuttle table 1102 moves left and right to shift the position of each tote in the set of totes during picking, transfer of the totes to the tote storage device, and/or for retrieval or dispensing of a tote to a user (removal of tote from storage). For example, the shuttle table can shift to the right to enable a stationary picker device or user to access the tote 1108 on the left side of the shuttle table. In another non-limiting example, the shuttle table can slide or move toward the right to enable a stationary picker device or stationary user to access the tote 1102 on the left side of the shuttle table.

The shuttle table 1102 slides to the left or to the right to enable a user to access one or more totes on the shuttle table. For example, if the shuttle table includes another tote (not shown) at a right end of the shuttle table in addition to totes 1104, 1106 and 1108, the shuttle table can slide or move to the left to enable the user to access the additional tote. If an additional tote is located on the left end of the shuttle table, the shuttle table can shift or move toward the right to enable the user to access the additional tote on the left side.

The shuttle table 1102 in some examples moves horizontally from side to side within a limited range of movement. The shuttle table in other non-limiting examples can include a motor, a battery, a set of wheels, a navigation system, a network device, a set of sensors, a memory and/or a processor for enabling auto-navigation across a wider range of movement. The shuttle table 1102 in some examples receives instructions from the decant manager component directing movement of the shuttle table.

Figure 12:
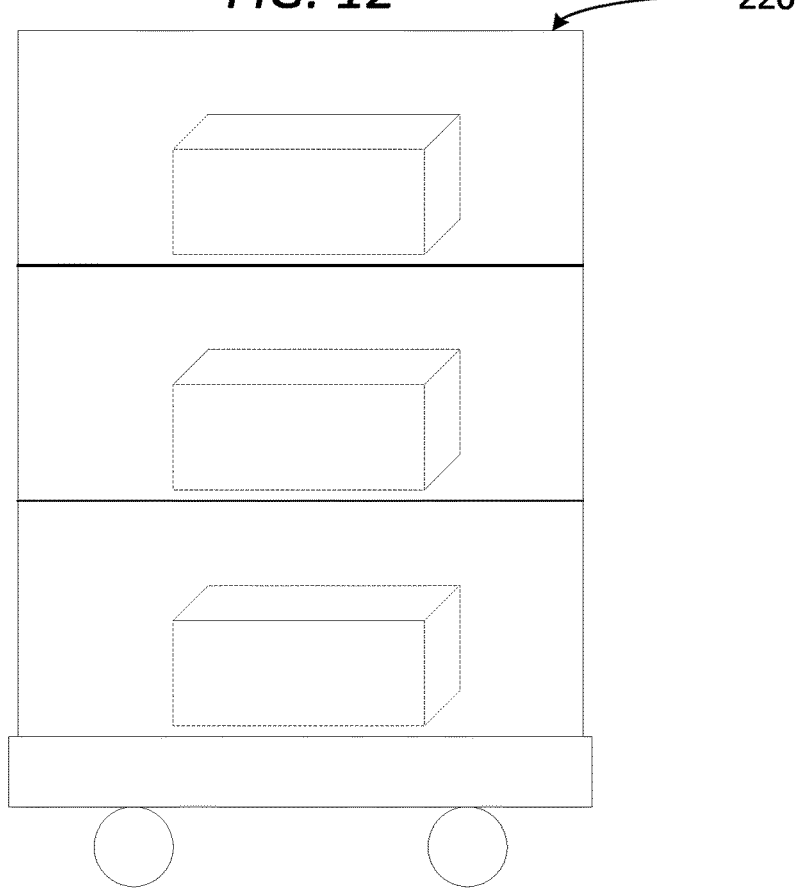
FIG. 12 is an exemplary block diagram illustrating a robotic tote transfer device.

FIG. 12 is an exemplary block diagram illustrating a robotic tote transfer device 226. The robotic tote transfer device 226 is any type of robotic device for moving one or more totes from one location, position or orientation to a different location, position or orientation. In this example, the robotic tote transfer device 226 is implemented as a cart storing three or more totes in a vertical configuration. The robotic tote transfer device 226 includes a set of one or more wheels for rolling/moving the robotic tote transfer device. A wheel in the set of wheels 1202 can be implemented as a roller, caster or any other type of wheel.

In this example, the set of totes on the robotic tote transfer device includes three totes. In other examples, the set of totes on the robotic tote transfer device can include a single tote, as well as two or more totes.

Figure 13:
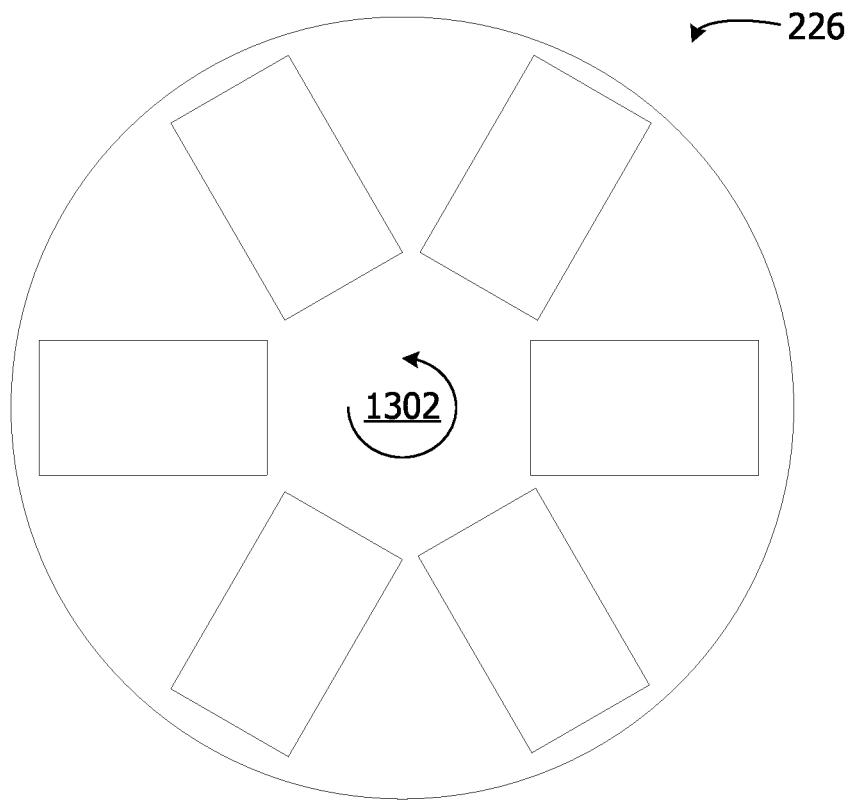
FIG. 13 is an exemplary block diagram illustrating a revolving robotic tote transfer device.

FIG. 13 is an exemplary block diagram illustrating a revolving robotic tote transfer device 226. In this non-limiting example, the robotic tote transfer device 226 rotates in a circular motion about an axis 1302 to change the location, position and/or orientation of one or more totes on the tote transfer device.

In this example, the set of totes on the robotic tote transfer device includes six totes. In other examples, the set of totes on the robotic tote transfer device can include a single tote, as well as two or more totes.

Figure 14:
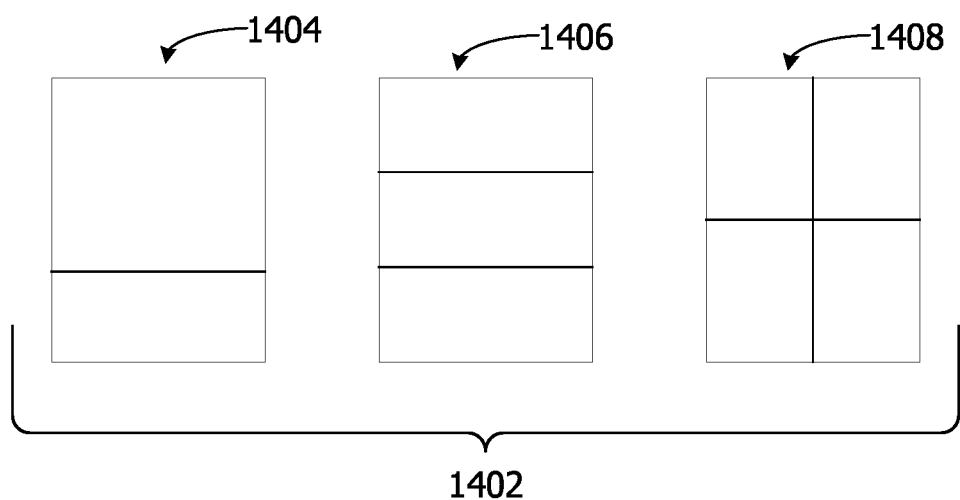
FIG. 14 is an exemplary block diagram illustrating a set of segmented destination totes.

FIG. 14 is an exemplary block diagram illustrating a set of segmented destination totes 1402. In this example, each tote includes one or more dividers to create two or more separate compartments within the tote. In this nonlimiting example, tote 1404 includes a single divider creating two separate compartments within the tote. Different items can be stored in each different compartment. The compartments can also enable items having different temperatures or sizes to be stored within the same tote without mixing those items together.

The two different compartments shown in 1404 are unequal in size. In other words, the divider is placed closer to one end of the tote than the other to create a larger amount of available space in one portion of the tote (one side of the divider) than on the other side of the divider (other portion of the tote).

The tote 1406 in this non-limiting example includes two dividers creating three compartments within the tote. The tote 1408 in another non-limiting example includes a single divider dividing the tote lengthwise and another divider dividing the tote widthwise to create four equal sized compartments within the tote. The examples are not limited to one or two dividers. In other examples, a tote can include three dividers, as well as four or more dividers. A tote can also include various combinations of lengthwise and widthwise divider(s).

Figure 15:
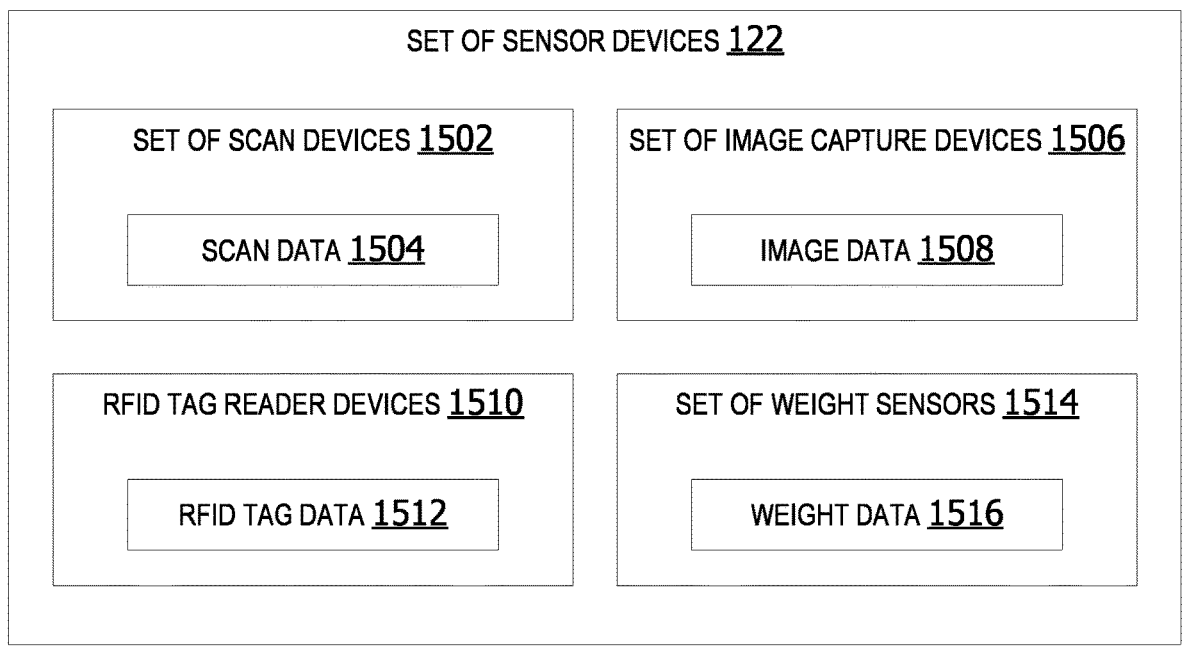
FIG. 15 is an exemplary block diagram illustrating a set of sensor devices.

FIG. 15 is an exemplary block diagram illustrating a set of sensor devices 122. The set of sensor devices 122 in some examples includes a set of one or more scan devices 1502 generating scan data 1504 associated with a pallet, a case, a tote and/or an item. The set of scan devices 1502 can include a barcode scanner, such as, but not limited to, a universal product code (UPC) reader, a quick response (QR) code reader, a matrix barcode reader or any other type of scanner.

A set of one or more image capture devices 1506 can be included in the set of sensor devices 122. An image capture device can be implemented as a camera, an infrared imaging device, or any other type of imaging device. The set of image capture devices 1506 generates image data 1508. The image data 1508 can include an image of a case, an image of a tote, an image of an item, an image of a portion of a case, an image of a portion of a tote, and/or an image of a portion of an item.

The set of sensor devices 122 in some examples includes a set of RFID tag reader devices 1510 generating RFID tag data 1512 associated with an RFID tag. An RFID tag reader device can read/obtain RFID tag data from an RFID tag on a case, an RFID tag on a tote and/or an RFID tag on an item.

The set of weight sensors 1514 is a set of one or more weight sensor devices, such as scales. A weight sensor can be included inside a tote, on the conveyor device, on a robotic picker device, on a robotic tote transfer device or anywhere else associated with the set of robotic decanting devices. The set of weight sensors 1514 generate weight data 1516 associated with a case, a tote and/or an item.

Figure 16:
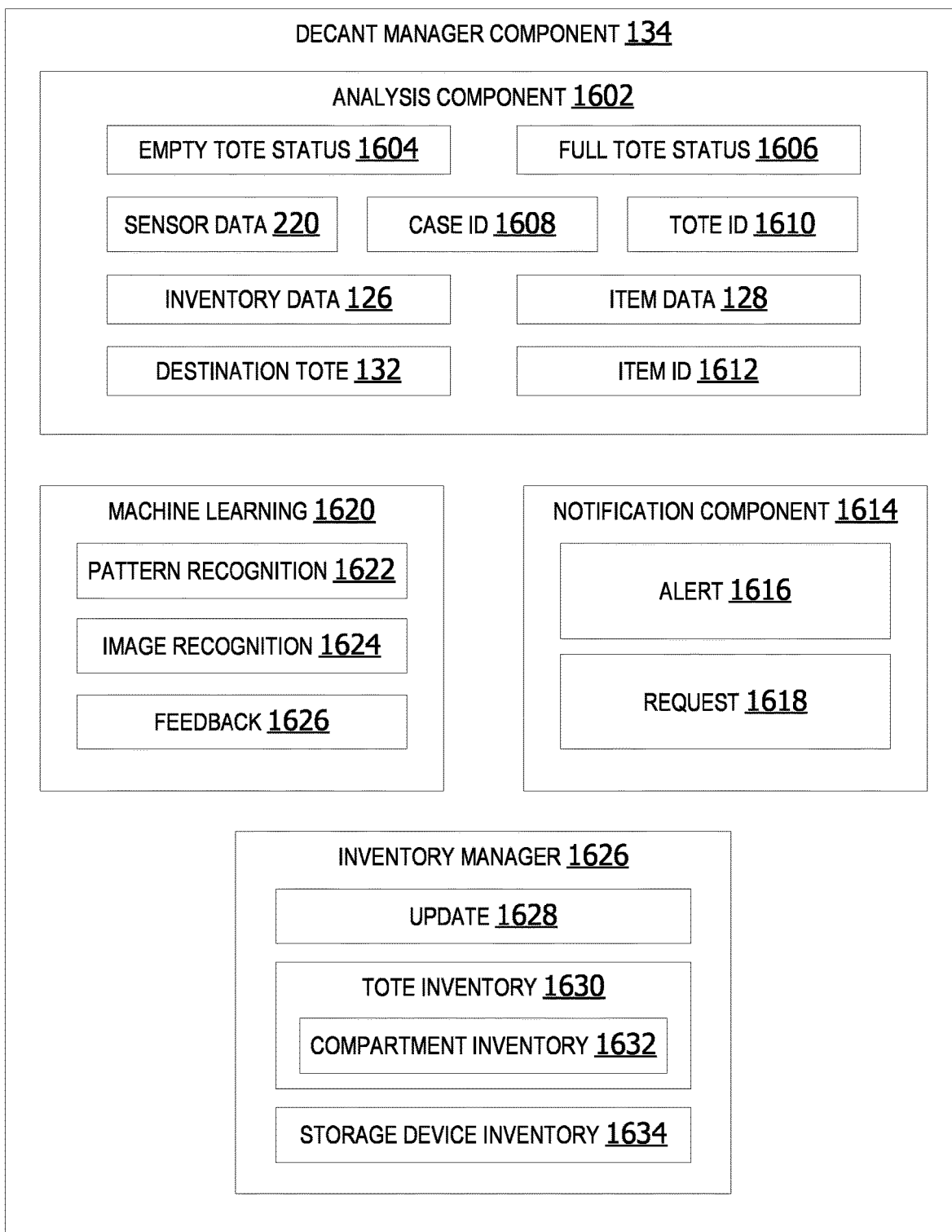
FIG. 16 is an exemplary block diagram illustrating a decant manager component.

FIG. 16 is an exemplary block diagram illustrating a decant manager component 134. The decant manager component 134 in some examples includes an analysis component 1602 that analyzes sensor data 220, inventory data 126, item data 128 and/or any other available data to identify items, cases and/or totes.

In some examples, the analysis component analyzes the sensor data 220 to determine a status of each tote in the set of totes. A tote status can include an empty tote status 1604 indicating a tote is empty or a full tote status indicating a tote is full 1606.

In other examples, the analysis component 1602 analyzes sensor data 220 and item data to determine a case identifier (ID) 1608, a tote ID 1610 and/or an item ID 1612. The case ID 1608 can be determined based on information on a case label, such as a barcode, an invoice number, a text description, etc. The item ID 1612 can be determined based on a barcode, RFID tag, QR code and/or label on the item. The item ID can also be determined based on the size, shape, color, weight or image of the item. The tote ID can be determined based on a label, barcode, RFID tag, QR code or another identifier on the tote.

In some examples, a notification component 1614 generates an alert 1616 which is output to a user if the system fails to identify an item, case and/or tote. An alert can also be output if a destination tote 132 for a particular item is unavailable. In other words, if the item is supposed to be placed into a tote having a tote ID 1610 which is not present, the system can output an alert notifying a user that the identified tote is missing or otherwise unavailable for filling or a request 1618 instructing a user to check the totes, replace the totes or otherwise take an action to reset the system.

The decant manager component 134 can optionally include a machine learning 1620 component including artificial intelligence for applying pattern recognition 1622 and/or image recognition 1624 to identify an item or tote based on analysis of image data generated by one or more image capture devices. The machine learning component 1620 utilizes feedback from one or more users to refine the item and/or tote identification process.

An inventory manager 1626 in some examples performs an update 1628 of inventory based on the decanting process. The inventory manager 1626 can update a tote inventory 1630 associated with a selected tote to add each item placed into the tote to the tote's inventory. The tote inventory 1630 can include a compartment inventory 1632 identifying contents of each compartment in a segmented tote.

The inventory manager can also update a tote storage device inventory 1634. The automated tote storage device inventory 1634 in some examples includes a tote ID for each tote inducted into the storage device. The storage device inventory 1634 in other examples also includes an inventory of each tote and/or the compartment inventory 1632 for each compartment in each segmented tote.

Figure 17:
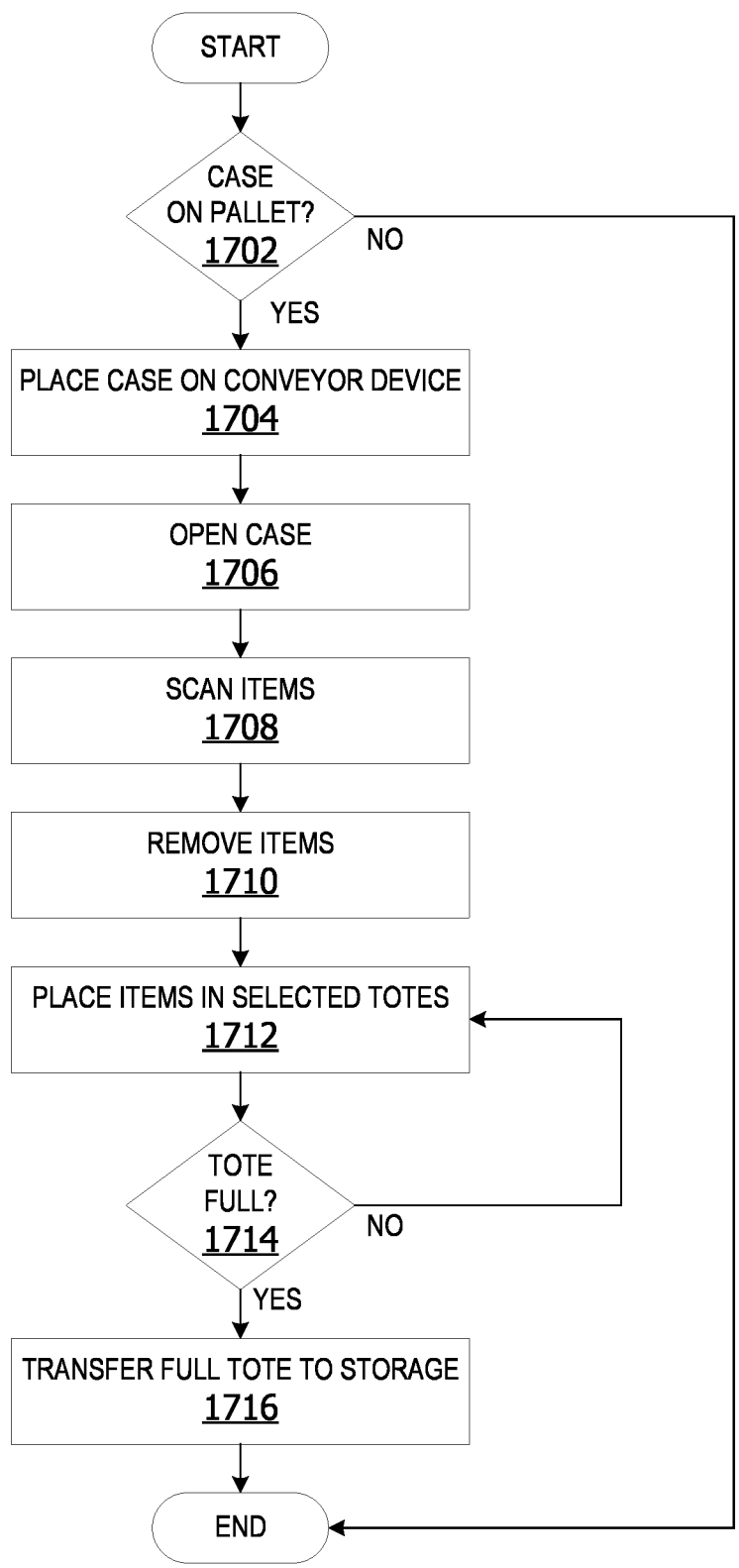
FIG. 17 is an exemplary flow chart illustrating operation of the set of robotic decanting devices to transfer items from a set of cases to a set of totes for induction into a tote storage device.

FIG. 17 is an exemplary flow chart illustrating operation of the set of robotic decanting devices to transfer items from a set of cases to a set of totes for induction into a tote storage device. The process shown in FIG. 17 is performed by a set of robotic decanting devices and/or a decant manager component, executing on a computing device, such as the computing device 102 or the user device 116 in FIG. 1.

The process begins by determining whether a case is on a pallet at 1702. If yes, a set of robotic de-palletizing devices place the case on a conveyor device at 1704. A robotic case opener device opens the case at 1706. A set of sensor devices scans items to identify each item at 1708. A robotic picker device removes items from the case at 1710. The robotic picker device places the items in selected totes at 1712. The decant manager component determines if a tote is full at 1714. If yes, a robotic tote transfer device transfers the full tote to a tote storage device at 1716. The process terminates thereafter.

While the operations illustrated in FIG. 17 are performed by a computing device, aspects of the disclosure contemplate performance of the operations by other entities. In a non-limiting example, a cloud service performs one or more of the operations.

Figure 18:
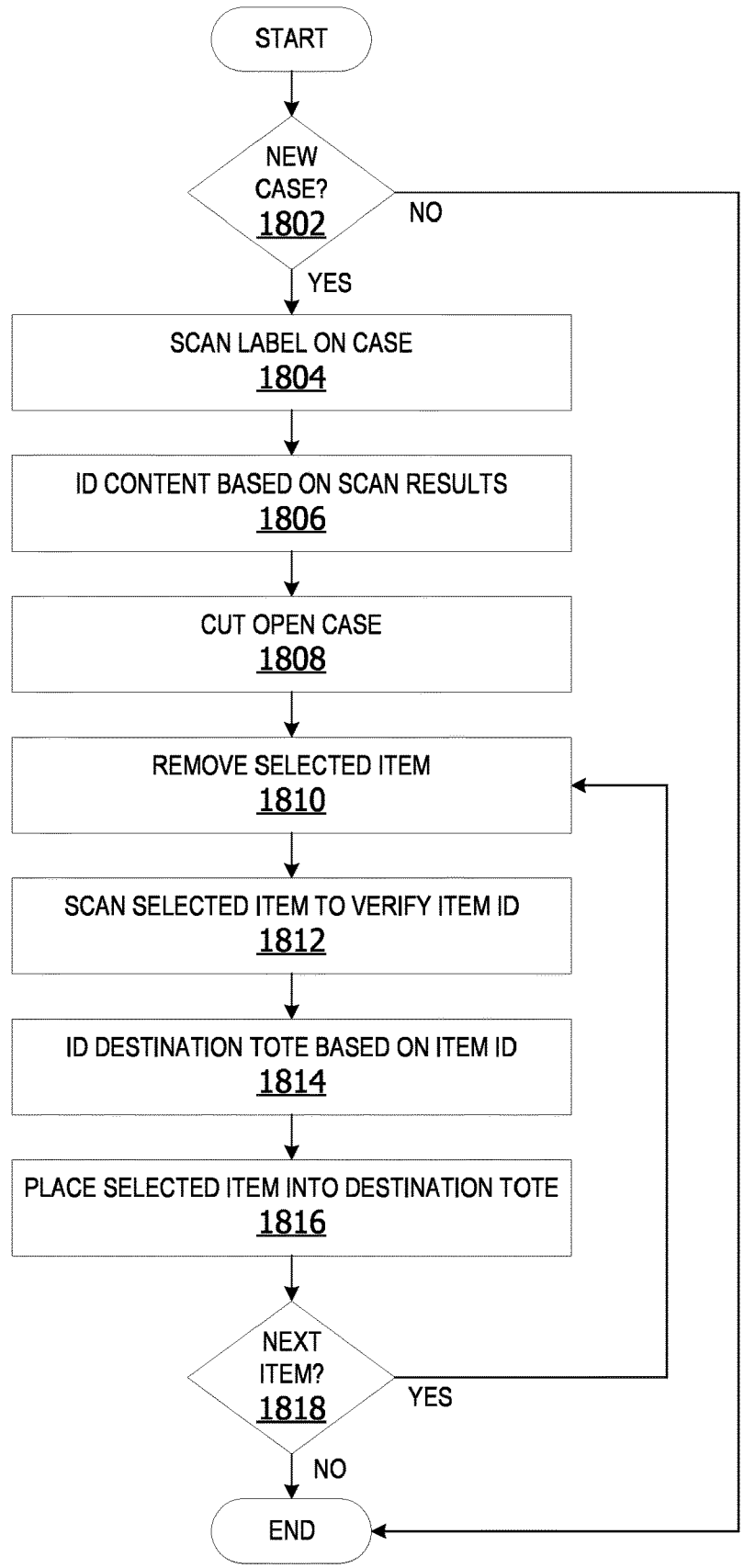
FIG. 18 is an exemplary flow chart illustrating operation of the set of robotic decanting devices to move a selected item from a case to a destination tote.

FIG. 18 is an exemplary flow chart illustrating operation of the set of robotic decanting devices to move a selected item from a case to a destination tote. The process shown in FIG. 18 is performed by a set of robotic decanting devices and/or a decant manager component, executing on a computing device, such as the computing device 102 or the user device 116 in FIG. 1.

The process begins by determining if a new case is ready at 1802. If yes, a set of sensor devices scans a label on the case at 1804. The system identifies the contents of the case based on the scan results (sensor data) at 1806. A robotic case opener devices cuts open the case at 1808. The case can be cut open using a cutting implement attached to a member of the robotic case opener device.

A robotic picker device removes a selected item from the case at 1810. A set of sensor devices scans the selected item to verify the item ID at 1812. The decant manager component identifies the destination tote based on the item ID at 1814. The robotic picker device places the selected item into a destination tote at 1816. The decant manager component determines if a next item is in the case at 1818. If yes, the process returns to 1810. The system iteratively implements operations 1810 through 1818 until no items remain in the case. The process terminates thereafter.

While the operations illustrated in FIG. 18 are performed by a computing device, aspects of the disclosure contemplate performance of the operations by other entities. In a non-limiting example, a cloud service performs one or more of the operations.

Figure 19:
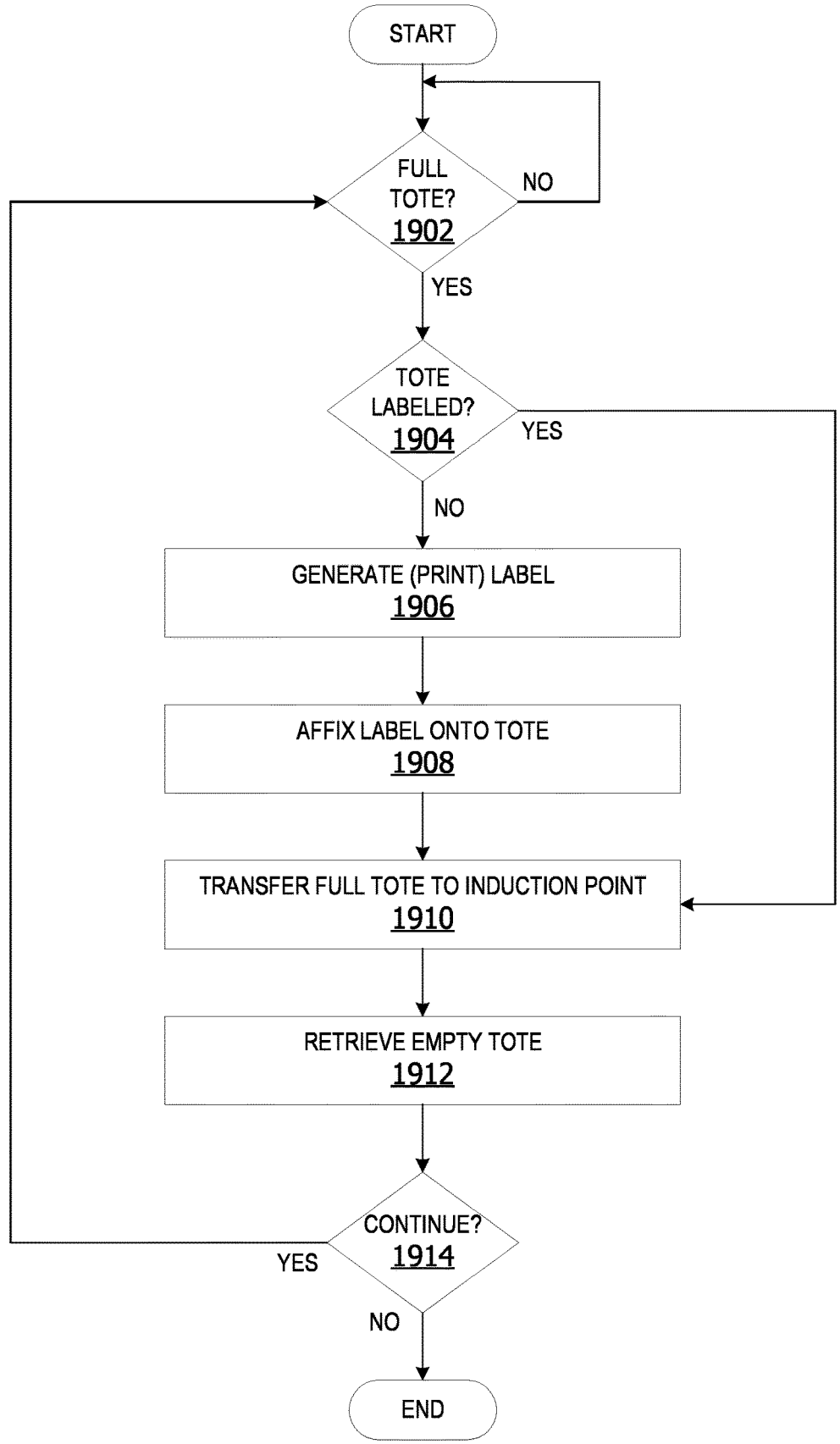
FIG. 19 is an exemplary flow chart illustrating operation of the set of robotic decanting devices to decant items from cases into totes.

FIG. 19 is an exemplary flow chart illustrating operation of the set of robotic decanting devices to decant items from cases into totes. The process shown in FIG. 19 is performed by a set of robotic decanting devices and/or a decant manager component, executing on a computing device, such as the computing device 102 or the user device 116 in FIG. 1.

The process begins by determining if a tote is full at 1902. If yes, the decant manager component determines if the tote is labeled at 1904. If no, the set of robotic decanting devices affixes a label to the tote at 1908. A robotic tote transfer device transfers the full tote to the induction point of the storage device at 1910. The robotic tote transfer device retrieves an empty tote at 1912. The decant manager component determines whether to continue at 1914. If yes, the system iteratively performs operations 1902 through 1914 until a determination is made not to continue at 1914. The process terminates thereafter.

While the operations illustrated in FIG. 19 are performed by a computing device, aspects of the disclosure contemplate performance of the operations by other entities. In a non-limiting example, a cloud service performs one or more of the operations.

Figure 20:
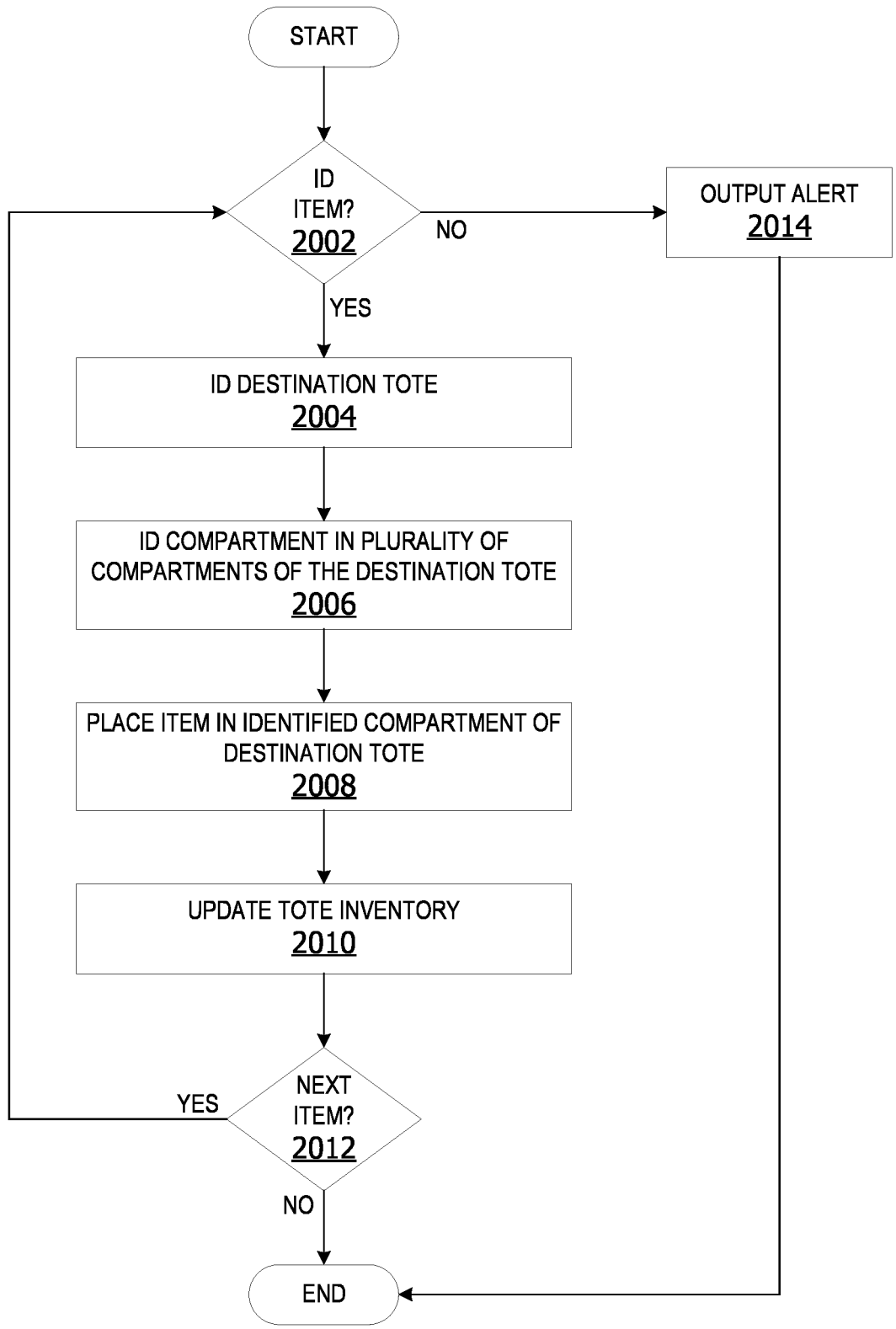
FIG. 20 is an exemplary flow chart illustrating operation of the set of robotic decanting devices to identify a destination compartment in a destination tote for a selected item.

FIG. 20 is an exemplary flow chart illustrating operation of the set of robotic decanting devices to identify a destination compartment in a destination tote for a selected item. The process shown in FIG. 20 is performed by a set of robotic decanting devices and/or a decant manager component, executing on a computing device, such as the computing device 102 or the user device 116 in FIG. 1.

The process begins by determining whether an item is identified at 2002. If yes, the decant manager component identifies a destination tote for the item at 2004. The decant manager component identifies a compartment in a plurality of compartments of the destination tote at 2006. The robotic picker device places the item in the identified compartment of the destination tote at 2008. The decant manager component updates tote inventory at 2010 to reflect addition of the identified item to the tote. The decant manager determines if there is a next item to place at 2012. If yes, the system iteratively performs operations 2002 through 2012 until there is not a next item at 2012. The process terminates thereafter.

Returning to operation 2002, if the item is unidentified, the decant manager component outputs an alert at 2014. The alert can be output via a user interface device or transmitted to the user via a network. The process terminates thereafter.

While the operations illustrated in FIG. 20 are performed by a computing device, aspects of the disclosure contemplate performance of the operations by other entities. In a non-limiting example, a cloud service performs one or more of the operations.

Additional Examples

In some examples, the system provides automated decanting of product from received cases to bins (totes) for transfer to storage. This integrates the decanting process with the automated storage and retrieval system. The automated decanting system in other examples includes the process of automatically opening cases by a set of robotic opener devices and placing the contents of the cases into one or more totes for induction into a storage system by a set of robotic picking devices.

In an example scenario, robots pick from an opened case directly into a shuttle table that moves left to the robots for filling. Once the tote(s) are filled, the shuttle table shuttles them right into the automated storage and retrieval system (storage device) induction area. The shuttle table can receive empty totes from the induct point running in reverse. This enables the system to put product "A" into a tote that already has some product "A" inside it. Alternatively, the shuttle table can receive empty totes via a cartridge or carousel.

In another example, a pallet is received off a truck or trailer. The system removes a case from the pallet and places it on the conveyor. An automated case cutter on a robotic arm with a blade on the end cuts open the case. A picking robotic arm picks items out of the case and places them into a tote. The cutter and robotic arm are attached along a conveyor belt (stationary robots). All actual movement is through conveyor until the tote transfer device is reached. The system puts the contents of cases into totes and inducts the totes into the automated storage.

In another example, the system includes a carousel mechanism having one or more empty totes in one or more empty tote positions. As items are placed into the totes by the robotic picker devices, the carousel turns to change the position of each tote. The totes are rotated to place the correct destination tote into position as each item is ready for placement into a tote. When a tote is full, the carousel device rotates out and into the induction point. A new empty tote take its place in the now open tote position on the carousel.

In one example, the carousel mechanism is a vertical carrousel having a vertical direction of motion. The carousel in this non-limiting example has three tote positions. In another non-limiting example, the carousel mechanism has six tote positions for holding six totes in place as the robotic picker device places items into the six totes. The totes can be full totes, half-filled totes, partially filled totes and/or empty totes. The device cycles to induct the totes that are full into the storage device at the inbound receiving side.

Alternatively, or in addition to the other examples described herein, examples include any combination of the following:
- a decant manager component, implemented on at least one processor of a computing device, wherein the decant manager component analyzes scan data generated by a set of sensor devices to identify contents of a case;
- a decant manager component, implemented on at least one processor of a computing device, wherein the decant manager component analyzes scan data generated by a set of sensor devices to identify an item removed from a case;
- a decant manager component, implemented on at least one processor of a computing device, wherein the decant manager component analyzes scan data generated by a set of sensor devices to identify contents of a selected tote;
- a decant manager component, implemented on at least one processor of a computing device, wherein the decant manager component analyzes scan data generated by a set of sensor devices to determine when a selected tote is full and ready for induction into the storage device;
- a decant manager component, implemented on at least one processor of a computing device, wherein the decant manager component outputs a notification to at least one user device associated with a user on condition an item removed from a case cannot be identified based on analysis of sensor data;
- a decant manager component, implemented on at least one processor of a computing device, wherein the decant manager component updates a tote inventory associated with a selected tote on condition an item is placed inside the selected tote;
- a decant manager component, implemented on at least one processor of a computing device, wherein the decant manager component updates a storage device inventory to include contents of a selected tote on condition the selected tote is successfully inducted into the storage device;
- a decant manager component, implemented on at least one processor of a computing device, wherein the decant manager component updates a selected tote compartment inventory to include a selected item on condition the selected item is added to the selected tote compartment by at least one robotic picker device;
- updating an inventory associated with the destination tote to include the selected item;
- identifying a compartment within a set of compartments associated with the destination tote associated with the selected item;
- placing, via the robotic picker device, the selected item into the identified compartment of the destination tote;
- updating a tote compartment inventory associated with the destination tote to include the selected item;
- updating a storage device inventory to include a contents of the destination tote on condition the destination tote is successfully inducted into the storage device;
- outputting an alert to a user interface device on condition the selected item remains unidentified or the destination tote is unidentified based on the item data and the sensor data;
- analyzing the sensor data with item data to identify each item inside the selected case;

analyzing the sensor data with item data to confirm an identification of each item placed into each compartment of the destination tote for inventory update;
a set of robotic de-palletizing devices removes a selected case comprising a set of items from a pallet at a de-palletizing station; and
a robotic tote transfer device transfers the destination tote to an induction point of an automated storage device.

At least a portion of the functionality of the various elements in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15 and FIG. 16 can be performed by other elements in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15 and FIG. 16, or an entity (e.g., processor 106, web service, server, application program, computing device, etc.) not shown in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15 and FIG. 16.

In some examples, the operations illustrated in FIG. 17, FIG. 18, FIG. 19 and FIG. 20 can be implemented as software instructions encoded on a computer-readable medium, in hardware programmed or designed to perform the operations, or both. For example, some aspects of the disclosure can be implemented as a system on a chip or other circuitry including a plurality of interconnected, electrically conductive elements. Other aspects of the disclosure are implemented on one or more robotic devices for decanting items from cases into totes for storage.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for decanting items from cases into totes via a set of robotic decanting devices. For example, the elements illustrated in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15 and FIG. 16, such as when encoded to perform the operations illustrated in FIG. 17, FIG. 18, FIG. 19 and/or FIG. 20, constitute exemplary means for analyzing sensor data generated by the set of sensor devices with inventory data to identify the set of items; exemplary means for identifying a destination tote in a set of totes for the selection item based on item data associated with the selected item; exemplary means for determining when a tote is full; and exemplary means for updating an inventory.

Other non-limiting examples provide one or more computer storage devices having a first computer-executable instructions stored thereon for providing automated decanting of cases into totes for storage. When executed by a computer, the computer performs operations including analyzing sensor data generated by the set of sensor devices with inventory data to identify the set of items; identifying a case, an item and/or a destination tote based on the sensor data and item data associated with the selected item; determining when a tote is full; and updating an inventory.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

In an exemplary embodiment, one or more of the exemplary embodiments include one or more localized Internet of Things (IoT) devices and controllers. As a result, in an exemplary embodiment, the localized IoT devices and controllers can perform most, if not all, of the computational load and associated monitoring and then later asynchronous uploading of summary data can be performed by a designated one of the IoT devices to a remote server. In this manner, the computational effort of the overall system can be reduced significantly. For example, whenever localized monitoring allows remote transmission, secondary utilization of controllers keeps securing data for other IoT devices and permits periodic asynchronous uploading of the summary data to the remote server. In addition, in an exemplary embodiment, the periodic asynchronous uploading of summary data can include a key kernel index summary of the data as created under nominal conditions. In an exemplary embodiment, the kernel encodes relatively recently acquired intermittent data ("KRI"). As a result, in an exemplary embodiment, KRI includes a continuously utilized near term source of data, but KRI can be discarded depending upon the degree to which such KRI has any value based on local processing and evaluation of such KRI. In an exemplary embodiment, KRI may not even be utilized in any form if it is determined that KRI is transient and can be considered as signal noise. Furthermore, in an exemplary embodiment, the kernel rejects generic data to provide a modified kernel ("KRG") by filtering incoming raw data using a stochastic filter that thereby provides a predictive model of one or more future states of the system and can thereby filter out data that is not consistent with the modeled future states which can, for example, reflect generic background data. In an exemplary embodiment, KRG incrementally sequences all future undefined cached kernels of data to filter out data that can reflect generic background data. In an exemplary embodiment, KRG further incrementally sequences all future undefined cached kernels having encoded asynchronous data to filter out data that can reflect generic background data.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for customized item decanting, the system comprising:
   a robotic picker device configured to remove a selected item from a selected case in an open configuration on a conveyor device;
   a decant manager, implemented on a processor, configured to identify a destination tote in a set of totes for placement of the selected item, wherein the robotic picker device places the selected item into the destination tote, and wherein the decant manager analyzes sensor data and item data associated with the selected item to confirm an identification of the selected item placed into the destination tote for inventory update.

2. The system of claim 1, further comprising:
   a robotic case opener device associated with the conveyor device, the robotic case opener device opening the selected case using an integrated cutting implement.

3. The system of claim 2, wherein the robotic picker device removes a smaller case from the selected case and wherein the robotic case opener device opens the smaller case using the integrated cutting implement prior to the robotic picker device removing the selected item.

4. The system of claim 1, further comprising:
   a robotic decanting device that removes the selected case from a pallet and places the selected case on the conveyor device for decanting.

5. The system of claim 1, further comprising:
   a robotic tote transfer device that transfers the destination tote to an induction point of a tote storage device.

6. The system of claim 1, wherein the decant manager is further configured to output a notification to a user device that the destination tote is full or unavailable.

7. The system of claim 1, wherein responsive to the decant manager being unable to confirm the identification of the selected item placed into the destination tote, the decan manager is further configured to output a notification to a user device.

8. The system of claim 1, wherein the robotic picker device is further configured to place the selected item into an individual compartment of the destination tote based on the item data.

9. The system of claim 1, wherein the set of totes includes at least one temperature-controlled tote.

10. A computer-implemented method for customized item decanting, the computer-implemented method comprising:
    controlling a robotic picker device to remove a selected item from a selected case in an open configuration on a conveyor device;
    identifying a destination tote in a set of totes for placement of the selected item;
    controlling the robotic picker device to place the selected item into the destination tote;
    analyzing sensor data and item data associated with the selected item to confirm an identification of the selected item placed into the destination tote for inventory update.

11. The computer-implemented method of claim 10, further comprising:
    controlling a robotic case opener device associated with the conveyor device to open the selected case using an integrated cutting implement.

12. The computer-implemented method of claim 10, further comprising:

controlling a robotic decanting device to remove the selected case from a pallet and places the selected case on the conveyor device for decanting.

13. The computer-implemented method of claim 10, further comprising:
controlling a robotic tote transfer device to transfer the destination tote to an induction point of a tote storage device.

14. The computer-implemented method of claim 10, further comprising:
determining that the destination tote is full or unavailable; and
outputting a notification to a user device responsive to the determination that the destination tote is full or unavailable.

15. The computer-implemented method of claim 10, further comprising:
outputting a notification to a user device responsive to an unconfirmed identification of the selected item placed into the destination tote.

16. The computer-implemented method of claim 10, further comprising:
controlling the robotic picker device to place the selected item into an individual compartment of the destination tote based on the item data.

17. The computer-implemented method of claim 10, wherein the set of totes includes at least one temperature-controlled tote.

18. A robotic decanting device comprising:
a processor;
a robotic picker device that removes a selected item from a selected case in an open configuration on a conveyor device;
a decant manager, implemented on the processor, configured to identify a destination tote in a set of totes for placement of the selected item and control the robotic picker device to remove the selected item from the selected case and place the selected item into the destination tote, wherein the decant manager analyzes sensor data and item data associated with the selected item to confirm an identification of the selected item placed into the destination tote for inventory update.

19. The robotic decanting device of claim 18, further comprising:
a robotic case opener device that opens the selected case using an integrated cutting implement.

20. The robotic decanting device of claim 18, wherein the decant manager is further configured to determine that the destination tote is full or unavailable and output a notification to a user device responsive to the determination that the destination tote is full or unavailable.

* * * * *